(12) United States Patent
Brewer et al.

(10) Patent No.: US 6,876,657 B1
(45) Date of Patent: Apr. 5, 2005

(54) SYSTEM AND METHOD FOR ROUTER PACKET CONTROL AND ORDERING

(75) Inventors: Tony M. Brewer, Plano, TX (US); Michael K. Dugan, Richardson, TX (US); Jim Kleiner, Dallas, TX (US); Gregory S. Palmer, Plano, TX (US); Paul F. Vogel, Garland, TX (US)

(73) Assignee: Chiaro Networks, Ltd., Richardson, TX (US)

( * ) Notice: Subject to any disclaimer, the term of this patent is extended or adjusted under 35 U.S.C. 154(b) by 838 days.

(21) Appl. No.: 09/737,646

(22) Filed: Dec. 14, 2000

(51) Int. Cl.[7] .............................................. H04L 12/28
(52) U.S. Cl. ...................... 370/394; 370/401; 370/414; 370/428
(58) Field of Search ............................... 370/394, 401, 370/412, 413, 414, 428

(56) References Cited

U.S. PATENT DOCUMENTS

| | | | | | |
|---|---|---|---|---|---|
| 5,309,435 | A | * | 5/1994 | Hirome ....................... | 370/244 |
| 6,147,996 | A | * | 11/2000 | Laor et al. ................... | 370/394 |
| 6,351,454 | B1 | * | 2/2002 | Crocker et al. ............. | 370/235 |
| 6,493,347 | B2 | * | 12/2002 | Sindhu et al. ............... | 370/401 |
| 6,519,248 | B1 | * | 2/2003 | Valko .......................... | 370/352 |
| 6,654,374 | B1 | * | 11/2003 | Fawaz et al. ................ | 370/394 |
| 6,711,357 | B1 | | 3/2004 | Brewer et al. | |

FOREIGN PATENT DOCUMENTS

| | | |
|---|---|---|
| WO | WO 98/35480 | 8/1998 |
| WO | WO 99/53648 | 10/1999 |
| WO | WO 00/72531 | 11/2000 |

OTHER PUBLICATIONS

U.S. Appl. No. 09/703,057, filed Oct. 31, 2000, Brewer et al.
U.S. Appl. No. 09/703,056, filed Oct. 31, 2000, Brewer et al.
U.S. Appl. No. 09/703,038, filed Oct. 31, 2000, Brewer et al.
U.S. Appl. No. 09/703,027, filed Oct. 31, 2000, Blackmon et al.
U.S. Appl. No. 09/703,043, filed Oct. 31, 2000, Blackmon et al.
U.S. Appl. No. 09/703,064, filed Oct. 31, 2000, McDermott, III et al.
European Search Report, dated Feb. 19, 2004, 4 pages.

* cited by examiner

*Primary Examiner*—Chau Nguyen
*Assistant Examiner*—Nittaya Juntima
(74) *Attorney, Agent, or Firm*—Fulbright & Jaworski LLP

(57) ABSTRACT

Hardware interconnected around multiple packet forwarding engines prepends sequence numbers to packets going into multiple forwarding engines through parallel paths, After processing by the multiple forwarding engines, packets are reordered using queues and a packet ordering mechanism, such that the sequence numbers are put back into their original prepended order. Exception packets flowing through the forwarding engines do not follow a conventional fast path, but are processed off-line and emerge from the forwarding engines out of order relative to fast path packets. These exception packets are marked, such that after they exit the forwarding engines, they are ordered among themselves independent of conventional fast path packets. Viewed externally, all exception packets are ordered across all multiple forwarding engines independent of the fast path packets.

42 Claims, 2 Drawing Sheets

SYSTEM AND METHOD FOR ROUTER PACKET CONTROL AND ORDERING

RELATED APPLICATIONS

This application is related to co-pending and commonly assigned U.S. application Ser. No. 09/703,057, entitled "System And Method For IP Router With an Optical Core," to co-pending and commonly assigned U.S. application Ser. No. 09/703,056, entitled "System and Method for Router Central Arbitration," to co-pending and commonly assigned U.S. application Ser. No. 09/703,038, entitled "System and Method for Router Data Aggregation and Delivery," to co-pending and commonly assigned U.S. application Ser. No. 09/702,958, entitled "Timing and Synchronization for an IP Router Using an Optical Switch," issued Mar. 23, 2004, as U.S. Pat. No. 6,711,357, to co-pending and commonly assigned U.S. application Ser. No. 09/703,027, entitled "Router Network Protection Using Multiple Facility Interfaces," to co-pending and commonly assigned U.S. application Ser. No. 09/703,043, entitled "Router Line Card Protection Using One-for-N Redundancy" and to co-pending and commonly assigned U.S. application Ser. No. 09/703,064, entitled "Router Switch Fabric Protection Using Forward Error Correction," all filed Oct. 31, 2000, the disclosures of which are incorporated herein by reference.

TECHNICAL FIELD

This application relates to the field of optical communication networks, and particularly to large-scale routers for optical communication networks.

BACKGROUND

Routers process information packets, typically, in the order received, so that the order of packets exiting a router is the same as the order of packets entering the router. Therefore, the incoming packet rate must be maintained throughout processing of the packet, so that the packet flow does not fall behind, resulting in queuing and latency of packets. There are typically many flow paths from input to output of a router. However, in a worst-case scenario all of the packets coming in through a particular port are routed to go to a common destination, all at the same QOS level, all through the same tributary. Packet forwarding at the input of a router must be able to handle that worst-case packet rate for an individual flow.

The rate at which packets flow through a system, for example a OC192c rate of 10 gigabits per second where an individual packet can be on the order of 40–50 nanoseconds in duration, must be maintained in processing these packets. In the industry today, packet forwarding engines are available that can handle a OC48c rate, which is 2.5 gigabits per second. However, the industry is not yet mature enough to provide packet forwarding engines that can handle packets at 10 gigabits per second. Therefore, solutions are needed that enable processing OC192c packet flow rates with existing packet forwarding engines that currently have less capability than a conventional OC48c or OC192c rate. Typically, individual packet forwarding engines, even for the lower OC48c rate, require many processing elements all working in parallel in a chip set or in an individual chip to handle a packet input rate at 2.5 gigabits per second. To handle packets at that rate typically requires multiple parallel processing elements. The individual packet forwarding engine is responsible for maintaining the order of the packets coming into the packet forwarding engine to make sure that packets are coming out in the same order. However, if multiple packet forwarding engines are ganged together to have a higher rate, the combined individual packet forwarding engines cannot maintain packet ordering.

SUMMARY OF THE INVENTION

The present invention is directed to a system and method which use multiple independent packet forwarding engines together, such that packet ordering is maintained. The hardware interconnected around these multiple packet forwarding engines prepends sequence numbers to the packets going into the packet forwarding engine, such that the sequence number is preserved on packets flowing through the combined packet forwarding engines. At the output of the packet forwarding engines, these packets are reordered using queues and a packet ordering mechanism, such that the sequence numbers are put back into the original order in which they were prepended to the original packets. Some of the packets that flow through the packet forwarding engines do not follow the conventional fast path, but rather emerge from the packet forwarding engines out of order relative to other packets. These are referred to as exception packets, which are handled off line. Accordingly, these exception packets are marked, such that when they exit the packet forwarding engines, exception packets are ordered among themselves independent of conventional fast path packets. From an external point of view, all of the exception packets are ordered across all of multiple packet forwarding engines independent of all of the fast path packets.

Various aspects of the invention are described in co-pending and commonly assigned U.S. application Ser. No. 09/703,057, entitled "System And Method For IP Router With an Optical Core," co-pending and commonly assigned U.S. application Ser. No. 09/703,056, entitled "System and Method for Router Central Arbitration," co-pending and commonly assigned U.S. application Ser. No. 09/703,038, entitled "System and Method for Router Data Aggregation and Delivery," co-pending and commonly assigned U.S. application Ser. No. 09/702,958, entitled "Timing and Synchronization for an IP Router Using an Optical Switch," issued Mar. 23, 2004, as U.S. Pat. No. 6,711,357, co-pending and commonly assigned U.S. application Ser. No. 09/703,027, entitled "Router Network Protection Using Multiple Facility Interfaces," co-pending and commonly assigned U.S. application Ser. No. 09/703,043, entitled "Router Line Card Protection Using One-for-N Redundancy" and co-pending and commonly assigned U.S. application Ser. No. 09/703,064, entitled "Router Switch Fabric Protection Using Forward Error Correction," all filed Oct. 31, 2001, the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
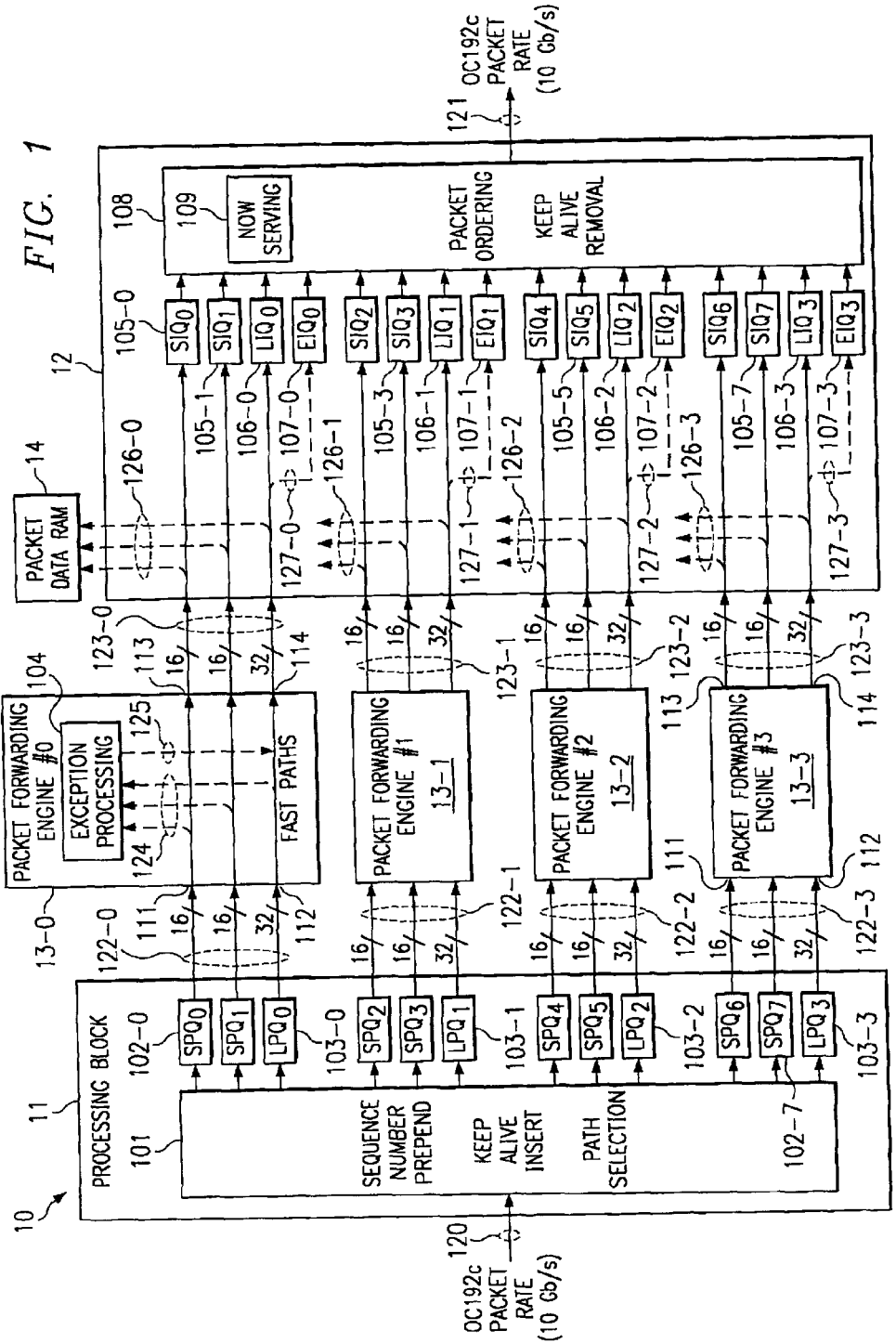
FIG. 1 is a simplified schematic diagram illustrating information packet flow and processing within a router system in an embodiment of the present invention.

FIG. 1 is a simplified schematic diagram illustrating information packet flow and processing within a router system 10, in an embodiment of the present invention. A facility ASIC 11 within a facility module of router system 10 receives data packets through an optical input link 120. Input link 120 is connected to a processing block 101 within facility ASIC 11, which performs three major functions: first, it prepends sequence numbers to each individual entering packet; second, it determines the exit path selection for all packets that enter processing block 101; and third, it inserts keep-alive packets into any exit path that is idle for a predetermined period of time. Exit paths from processing block 101 are connected to multiple queues 102-0 through 102-7 and 103-0 through 103-3 within facility ASIC 11, which in turn are interconnected through links 122-0 through 122-3 with input ports 111-112 of packet forwarding engines 13-0 through 13-3 within a packet forwarding module (PFM) of router system 10.

Packet forwarding engines 13-0 through 13-3 are devices that inspect the packet headers of all of the input data packets received through link 120. Based on the inspection of those headers, a determination of the intended destination of each packet is made. Packet forwarding engines 13-0 through 13-3 also determine if any particular packet is intended for a local destination within the router and accordingly directs it toward the main control processor of the router instead of transmitting it downstream and out through a router output port to a peer router across the network. Packet forwarding engines 13-0 through 13-3 are obtained as off-the-shelf processing devices, for example IQ2000™ Network Processors from the Vitesse Semiconductor Corporation, 741 Calle Plano, Camarillo, Calif. 93012. The IQ2000™ Network Processors, originally designed for gigabit Ethernet processing, are used in the present system for gigabit Ethernet and SONET OC48c as well as OC192c processing, using techniques described below to maintain packet ordering through multiple processing engines 13-0 through 13-3 and through multiple input ports 111-112 of each single processing engine 13-0.

Output ports 113-114 of packet forwarding engines 13-0 through 13-3 are interconnected through output links 123-0 through 123-3 with multiple reorder queues 105-0 through 105-7, 106-0 through 106-3, and through links 127-0 through 127-3 with reorder queues 107-0 through 107-3, all contained within an ingress ASIC 12. A packet data RAM memory 14 is interconnected with ingress ASIC 12 through interconnect links 126-0 through 126-3. Ingress ASIC 12 stores packet data in packet data RAM memory 14 and loads corresponding packet header information including destination address and packet data RAM location pointer into the various reorder queues 105-0 through 105-7, 106-0 through 106-3, and 107-0 through 107-3, which are connected to a packet ordering block 108, described below in more detail, which contains a now-serving counter 109 and is connected with an output link 121 within ingress ASIC 12.

Packet forwarding engines 13-0 through 13-3 have limitations which must be overcome. First, any individual input port 111-112 of packet forwarding engine 13-0 through 13-3 can accommodate at most a flow of 2.1 million packets per second. Second, the bandwidth of an individual port is limited, depending on its configuration: 16-bit narrow ports 111, identified by a label 16, are capable of handling up to 1.6 Gb/s, whereas 32-bit wide ports 112, identified by a label 32, are capable of up to 3.2 Gb/s. Accordingly, a 32-bit wide port is sufficient to handle a 2.5 Gb/s OC48c rate packet stream.

In operation IP data packets enter processing block 101 in input facility ASIC 11 through link 120 at a OC192c rate often gigabits per second. Processing block 101 prepends a four-byte header on each packet that it receives, determines the exit path selection for all packets, and inserts keep-alive packets into any output link 122-0 through 122-3 that is idle for a programmable predetermined period of time. The header contains, among other bits, sequence numbers for each individual entering packet and identification of which packet forwarding engine port to use. Once an exit path from processing block 101 has been selected, a packet then goes to the corresponding queue 102-0 through 102-7 or 103-0 through 103-3, from which the packets flow through appropriate links 122-0 through 122-3 to packet forwarding engines 13-0 through 13-3. As described above, a 32-bit wide port 112 is sufficient to handle a 2.5 Gb/s OC48c rate packet stream. However, it cannot handle this data rate for minimal size 40-byte IP packets, which would then flow at roughly 6.1 million packets per second, exceeding the forwarding engine input port limitation of 2.1 million packets per second. Therefore a solution to allow readily available packet forwarding engines 13-0 through 13-3 to perform OC192c rate forwarding of even minimal size packets, yet at the same time allow packets to have available the resources of the larger bandwidth port of the packet forwarding engine, would be advantageous.

This is accomplished in processing block 101 using a path selection procedure. First it is determined whether the packet size is greater than roughly 200 bytes. This threshold determines whether wide port 112 alone into packet forwarding engine 13-0 has sufficient packet rate capability to handle the packet. With only large packets greater than 200 bytes in size, there is sufficient packet rate capability to use only wide ports 112, which are interconnected with queues 103-0 through 103-3. If on the other hand only small packets travel through the system, these small packets are advantageously distributed among all of the input ports 111, 112 of packet forwarding engine 13-0. Accordingly all input ports 111, 112 and all input queues 102-0 through 102-7 as well as 103-0 through 103-3 are utilized.

An algorithm in processing block 101 determines whether an input packet has greater than 200 bytes. If so, then the algorithm selects the large packet queue 103-0 through 103-3 having the minimum amount of space currently occupied or, conversely, the most space available. If the input packet is smaller than 200 bytes, however, the algorithm looks across all 12 of the output queues 102-0 through 102-7 as well as 103-0 through 103-3, respectively, and selects the queue that has the most space available or, equivalently, the queue that has the least amount of space occupied. Typically multiple queues will be empty, in which case a round robin algorithm inspects the queues sequentially, to ensure that all queues are used periodically and that the packets are spread roughly equally across these queues, to meet the packet-per-second limitations at input ports 111, 112 to packet forwarding engine 13-0. When running with minimum size 40-byte packets only, once these are distributed equally, each input port 111, 112 will have 2.1 million packets per second arriving through each of 12 links 122-0 through 122-3 at packet forwarding engines 13-0 through 13-3. This roughly equals the capacity of input ports 111, 112 of packet forwarding engine 13-0, namely 2.1 to 2.2 million packets per second.

Accordingly, the limitations described above will not create a bottleneck at the input to packet forwarding engine 13-0. Similarly, when running with packets greater than 200 bytes, those packets are distributed equally among queues 103-0 through 103-3 connected with the input ports 112 of packet forwarding engines 13-0 through 13-3, thus remaining within the per port limitation of 2.1 million packets per second. The reason that larger packets are preferably delivered to wide port 112 is to minimize the latency in going through links 122-0 through 122-3. Packets that flow across input link 120 at 10 Gb/s require roughly three times longer to travel across links 122-0 through 122-3 to packet forwarding engines 13-0 through 13-3, coming out of the 32-bit large packet queues 103-0 through 103-3. Accordingly, queues 102-0 through 102-7 and 103-0 through 103-3 are rate matching to convert from high burst input rates to lower substantially steady output rates. The contents of a queue can thus exit at a slower rate without loss of data. To minimize the additional latency that a packet incurs in passing through links 122-0 through 122-3, larger packets are assigned to 32-bit wide packet queues 103-0 through 103-3. On the other hand, latency for a smaller packet is dominated more by the actual time it takes to propagate through the system, rather than by queuing delays incurred in rate matching. Accordingly, it is adequate simply to spread smaller packets among narrow queues 102-0 through 102-7.

Within packet forwarding engines 13-0 through 13-3, packets normally flow directly along a "fast path" through a microchip processing the packets in the order received from one input 111, 112 to the corresponding output 113, 114, and then exit the packet forwarding engine through links 123-0 through 123-3. Exception packets, which are not able to be processed completely or using the fast path of the packet forwarding engine, are taken out of order and processed independently by an exception processing element 104, linked by a data path 124 with input ports 111, 112. Exception packets are identified by an exception bit in the prepended header of the packet. This bit is cleared by facility ASIC 11, and set by exception processor 104. Thus, if a packet takes the "fast path," the exception bit stays cleared. Once an exception packet has been identified and processed, it then exits exception processing element 104 through a data path 125 to wide output port 114. Thus, all exception packets exit packet forwarding engines 13-0 through 13-3 through wide output port 114.

The processed packets then enter ingress ASIC 12 through 12 links 123-0 through 123-3 to be restored to their original order by the ingress ASIC. Once the packets enter ingress ASIC 12 using any of the 12 links 123-0 through 123-3, the packet header information is inserted into appropriate reorder queues 105, 106 and 107, and the data payloads are sent out through links 126-0 through 126-3 and stored in packet data RAM memory 14 external to ingress ASIC 12. The header information that is put into reorder queues 105, 106 and 107 is then used to determine the correct order in which these packets should exit packet ordering block 108.

At packet ordering block 108, two separate orderings occur. A first ordering for packets that followed the "fast path" through packet forwarding engine 13 is performed by ordering the packet headers in reorder queues 105-0 through 105-7 and in reorder queues 1060 through 106-3. Packet ordering block 108 includes now-serving counter 109, which specifies which sequence number is next in order to be taken out of reorder queues 105-0 through 105-7 and reorder queues 106-0 through 106-3. For example, if now-serving block 109 states that the next sequence number to be expected is sequence number 50, then packet ordering block 108 examines all 12 reorder queues 105-0 through 105-7 and 106-0 through 106-3, waiting until a packet labeled sequence number 50 arrives, at which time it removes the header for packet 50 out of the reorder queue and sends it out through link 121. If, on the other hand, a packet arrives in each of the 12 reorder queues and none of them indicates packet sequence number 50, now-serving counter 109 automatically increments the now-serving number from 50 to 51 and again examines the 12 reorder queues 105-0 through 105-7 and 106-0 through 106-3 to determine if a packet header with sequence number 51 is available. Now-serving counter 109 iterates in this fashion until it finds a packet header in one of the 12 reorder queues matching the present now-serving number.

A scenario can occur in which a sequence number has been dropped either completely and the packet discarded, or in which a packet has been determined to be an exception packet that has been processed out of order by exception processing element 104. In either case all 12 reorder queues 105-0 through 105-7 and 106-0 through 106-3 will be full without a match to the now-serving number. In either scenario, once all 12 reorder queues 105-0 through 1057 and 106-0 through 106-3 are filled, now-serving counter 109 will increment the now-serving number until a match is found.

Another scenario that can occur is not to receive any packet in any of the 12 reorder queues for a programmable period of time. In this case an input port on a packet forwarding engine has not been issued a packet for the programmable period of time, and processing block 101 inserts keep-alive packets into the packets stream. If any one of the 12 links exiting from facility ASIC 11 and entering ingress ASIC 12 has not had a packet received or sent out on it during roughly 10 microseconds or other programmable time period, then processing block 101 inserts a keep-alive packet into a narrow queue 102-0 through 102-7. The keep-alive packets pass through the packet forwarding engines to ingress ASIC 12, where they are put into a narrow reorder queue 105, 106. Ingress ASIC 12 processes the keep-alive packets just like other packets, except that when one packet is selected, instead of being passed on through output link 121, the keep-alive packet is dropped.

As an example of their benefit, if a number of large packets are received on a facility module input and occasionally a packet needs exception processing, then without keep-alives, the packet immediately following an exception packet would eventually reach the head of queue 106. Further, if the associated queues 105 are empty (no small packets and assuming no keep-alives), and if now-serving counter 109 has the sequence number of the packet that bad to have exception processing, the mechanism must either wait until all queues 105 and 106 contain packets or wait until a time out occurs. The time out value needs to be large to avoid prematurely incrementing now-serving counter 109. Thus, without the keep-alive packets, a large delay is added. With keep-alives, however, the other queues will receive a keep-alive fairly quickly, causing all queues 105 and 106 to be non-empty. This alerts the now-serving mechanism that a packet was either dropped or required exception processing. The now-serving counter is incremented (since the queues are non-empty and the sequence number does not match). The keep-alive packets are inserted to ensure that packet headers are reordered at packet ordering block 108 with minimal delay incurred because of dropped or exception packets.

Additionally, queues 105, 106 can be monitored. If a packet is not received (either regular packet or keep-alive) within a programmable period of time, then a problem exists and an alarm can be issued.

A second separate ordering at packet ordering block 108 is applied to exception packets. Exception packets are identified by an exception bit in the prepended header of each packet. This bit is cleared to zero by processing block 101 and then set to one by exception processor 104, and is used to determine whether an exception packet should be assigned to exception reorder queue 107-0 instead of reorder queue 106-0. When exception packets arrive at ingress ASIC 12, the payload data is again delivered to data packet RAM 14 through links 126, but the header information is loaded through exception links 127-0 through 127-3 respectively into exception reorder queues 107-0 through 107-3 and is used to reorder exception packets among themselves independent of conventional "fast path" packets. Packet headers in exception reorder queues 107-0 through 107-3 are reordered by an algorithm similar to that described above for conventional packet headers, which examines all four exception reorder queues. If a packet has been in a reorder queue 107-0 through 107-3 for a long enough period of time that a time-out mechanism occurs, then packet ordering block 108 selects and delivers the lowest sequence number that is in any of the exception reorder queues. If an exception packet header information exists in all four exception reorder queues, then again packet ordering block 108 selects and delivers the lowest sequence number exception packet header. Four exception reorder queues 107-0 through 107-3 are adequate, because exception processing elements 104 send their exception packets only through links 125 within packet forwarding engines 13-0 through 13-3 and only through exception links 127-0 within ingress ASIC 12. Accordingly, two streams of packets are independently ordered.

After the packet header information is sent out of packet ordering block 108 through output link 121, it is loaded into a virtual output queue within ingress ASIC 12, based on the destination address of the packet header. Ingress ASIC 12, based on the states of various queues that it maintains, sends requests to a central arbiter (not shown in FIG. 1), which determines, based on all of the packets that are being processed through the router in aggregate at any given time, which of the requests from a particular ingress ASIC should be granted and when it should be granted for transmission across the router switch fabric. Grants of those requests return to ingress ASIC 12, which uses that grant information to extract packets from packet data RAM memory 14 in the appropriate order to be matched with corresponding header information and assembled into chunk payloads for eventual passage through the router switch fabric. Accordingly, it is only after a grant is received from the arbitration mechanism that packet data is extracted out of packet data RAM 14 to fill a data chunk.

Another bit in the packet header indicates that a packet should be sent through the packet forwarding engines 13-0 through 13-3 without regard to ordering. The bit is used when the exception processor needs to send a packet that it originated. These packets did not arrive from a facility module, so have no sequence number. If the exception processor needs to create a packet of its own, it does so, including the 4-byte header that facility ASIC 11 usually prepends. Facility ASIC 11 sets the ordering bit, and exception processor 104 clears the bit on packets that it creates (not on packets that it receives from the packet forwarding engines). When ingress ASIC 12 receives a packet with the ordering bit clear, then ingress ASIC 12 puts the packet into one of reorder queues 105, 106, 107. However, when the packet reaches the head of the queue it is immediately pulled out and sent on (to a virtual output queue).

Figure 2:
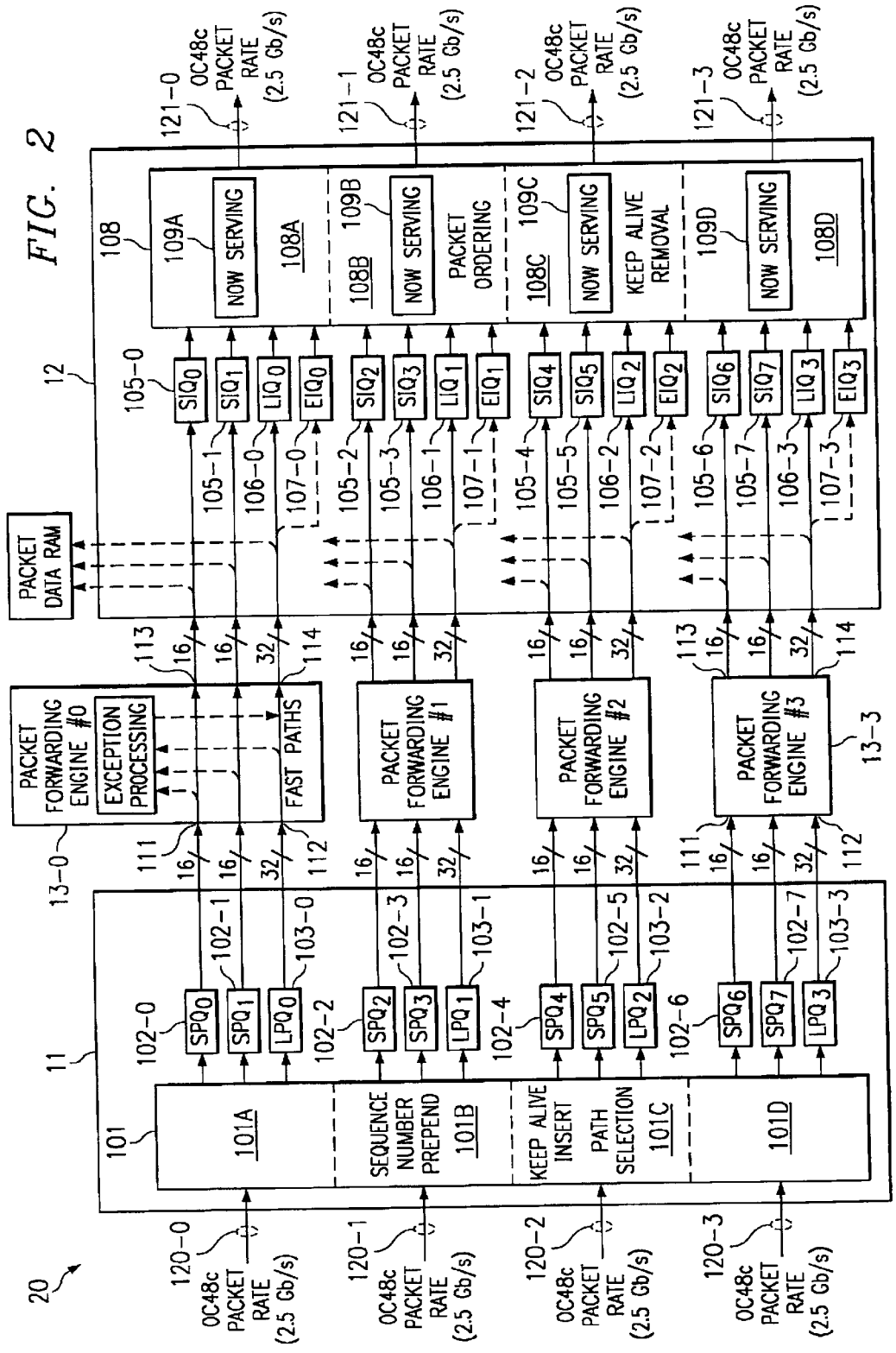
FIG. 2 is a simplified schematic diagram illustrating information packet flow and processing within a router system in an alternative embodiment to that of FIG. 1.

FIG. 2 is a simplified schematic diagram illustrating information packet flow and processing within a router system 20, in an alternative embodiment to that of FIG. 1. Packets enter processing block 101 through four independent 2.5 Gb/s inputs 120-0 through 120-3. Similarly, processing block 101 is partitioned into four separate processing units 101A through 111D, each of which performs a function similar to that of processing block 101 of FIG. 1, but on a smaller subset, narrow input bandwidth datastream than that shown in FIG. 1. Each of four processing units 101A through 101D has only three exit links, for example processing unit 101A has two narrow links to queues 102-0 and 102-1 respectively and one wide link to queue 103-0.

The same algorithm applies as that described in connection with FIG. 1. If a packet is received that is greater in size than roughly 200 bytes, it is automatically loaded into single wide packet queue 103-0, whereas if a packet is smaller in size than roughly 200 bytes, then it is assigned in a round robin fashion among all three of queues 102-0, 102-1 and 103-0, sending this packet to the queue that has the least amount of presently occupied space.

At ingress ASIC 12 each set of three links brought in from a particular packet forwarding engine 13-0 through 13-3 is handled independently. Packet ordering block 108 is similarly partitioned into four sub-units 108A through 108D. Each sub-unit has its independent now-serving counter 109A through 109D and its own OC48c exit path 121-0 through 121-3 respectively exiting that sub-unit. Sub-unit 108A for example examines the three reorder queues 105-0, 105-1 and 106-0 that are used for fast path packet processing, and now-serving block 109A from among these three reorder queues selects the lowest numbered packet header. If all three reorder queues are full, now-serving block 109A increments the now-serving number until it matches an information packet header in one of the three reorder queues, to determine which packet is next to exit. Exception reorder queue 107-0 is a single reorder queue, such that any exception packet header arriving in that reorder queue can be taken out immediately and sent through exit path 121-0 without waiting to time out or for now-serving or for any other reorder queues to fill up.

Also in FIG. 2, input streams 120-0 through 120-3 can be further subdivided into multiple 1.0 Gb/s Ethernet streams. The input streams then are processed by taking the 2.5 gigabit-per-second streams and labeling packets that come across them for either of two gigabit Ethernet streams. Each of the input links 120-0 through 120-3 is responsible for passing each of two gigabit Ethernet streams directly to an individual small queue 102-0 through 102-7. Because each small queue can handle up to 1.6 Gb/s rate, there will be no rate mismatch. From small queues 102-0 through 102-7, the gigabit Ethernet packets flow through packet forwarding engines 13-0 through 13-3 along either the fast path or the exception path, and then flow into ingress ASIC 12, which stores the packet headers in reorder queues 105-0 through 105-7. Because the paths are completely independent, packet headers can be removed from those reorder queues as soon as they arrive, without requiring the use of a now-serving counter or other mechanism. Similarly, any exception packet headers are stored in exception reorder queues 107-0 through 107-3 and can immediately be removed and sent out through output links 121-0 through 121-3.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for router packet control and ordering comprising:
   a packet forwarding engine containing a plurality of fast data paths each interconnected with an input port and an output port;
   a processing block interconnected with said input ports of said packet forwarding engine through a plurality of rate matching queues;
   an ingress application specific integrated circuit (ASIC) containing a packet ordering block, said packet ordering block interconnected with said output ports of said packet forwarding engine through a plurality of reorder queues within said ingress ASIC; and
   a packet data random access memory (RAM) interconnected with said ingress ASIC, wherein said packet forwarding engine contains an exception processor, such that said fast data path bypasses said exception processor and such that said fast data path is interconnected with said exception processor through an exception data path.

2. The system of claim 1 wherein said input ports of said packet forwarding engine include a wide bandwidth port and a narrow bandwidth port.

3. The system of claim 2 wherein said wide bandwidth port has a capacity of approximately 3.2 gigabits per second (Gb/s).

4. The system of claim 2 wherein said narrow bandwidth port has a capacity of approximately 1.6 Gb/s.

5. The system of claim 1 wherein said reorder queues include an exception reorder queue.

6. The system of claim 1 wherein said packet ordering block contains a now-serving counter.

7. The system of claim 1 wherein said processing block is interconnected with an input data link having a bandwidth capacity of approximately 10 Gb/s.

8. The system of claim 1 wherein said processing block is interconnected with multiple input data links, such that each said data link has a bandwidth capacity of at least 1.0 Gb/s.

9. The system of claim 8 wherein each said data link has a bandwidth capacity of approximately 2.5 Gb/s.

10. A system for router packet control and ordering comprising:
    a packet forwarding engine containing a plurality of fast data paths each interconnected with an input port and an output port;
    a processing block interconnected with said input ports of said packet forwarding engine through a plurality of rate matching queues;
    an ingress application specific integrated circuit (ASIC) containing a packet ordering blocks said packet ordering block interconnected with said output torts of said packet forwarding engine through a plurality of reorder queues within said ingress ASIC; and
    a packet data random access memory (RAM) interconnected with said ingress ASIC, said system comprising a plurality of said packet forwarding engines, such that each said packet forwarding engine contains a plurality of fast data paths each interconnected with an input port and an output port, each said input port interconnected with said processing block through a plurality of rate matching queues; and each said output port interconnected with said packet ordering block through a plurality of reorder queues within said ingress ASIC.

11. The system of claim 10 wherein said processing block is interconnected with an input data link having a bandwidth capacity of approximately 10 Gb/s.

12. The system of claim 10 wherein said processing block is interconnected with multiple input data links, such that each said data link has a bandwidth capacity of at least 1.0 Gb/s.

13. The system of claim 12 wherein each said data link has a bandwidth capacity of approximately 2.5 Gb/s.

14. The system of claim 10 wherein said processing block is partitioned into a plurality of independent processing sub-blocks.

15. The system of claim 10 wherein said packet ordering block is partitioned into a plurality of independent packet ordering sub-blocks.

16. A method of control and ordering of information packets in a network router comprising:
    receiving through an input data link said packets;
    sequence numbering said packets;
    distributing said packets among a plurality of rate matching queues, such that each said rate matching queue feeds one of substantially parallel data links having differing information rates;
    flowing said packets through said plurality of substantially parallel data links at differing information rates; and
    reordering said packets after said flowing;
    said packets comprising fast path packets and exception packets different from said fast path packets, wherein said exception packets are processed within a portion of said plurality of substantially parallel data links that is bypassed by said fast path packets, wherein said exception packets are reordered separately and independently from said fast path packets; and
    wherein said reordering of fast path packets comprises:
    receiving said fast path packets from said substantially parallel data links;

separating said packet headers from said packet payloads;
loading said packet headers into a plurality of fast path reorder queues; and
removing said packet headers from said fast path reorder queues in order of said sequence numbering.

17. The method of claim 16 wherein said removing comprises:
 a. incrementing a now-serving number by one unit;
 b. if a packet header having a sequence number matching said now-serving number is in said plurality of fast path reorder queues, then removing said packet header and iterating steps a and b; otherwise
 c. after a subsequent packet header arrives in each of said fast path reorder queues, if a packet header having a sequence number matching said now-serving number is in said plurality of fast path reorder queues, then removing said packet header and iterating steps a, b and c; otherwise
 d. iterating steps a, b, and c until a packet header is found having a sequence number matching said now-serving number.

18. The method of claim 17 wherein, if any of said plurality of fast path reorder queues does not receive a subsequent packet header during a programmable elapsed period of time, then inserting a keep-alive packet into a fast path reorder queue.

19. The method of claim 18 wherein said programmable elapsed period of time is on the order of 10 microseconds.

20. The method of claim 16 further comprising storing said separated packet payloads in a memory device.

21. The method of claim 16 wherein said substantially parallel data links are limited to a maximum packet flow rate of approximately 2.1 million packets per second.

22. The method of claim 16 wherein a portion of said substantially parallel data links are narrow bandwidth data links.

23. The method of claim 22 wherein a portion of said substantially parallel data links are wide bandwidth data links, such that a maximum bandwidth limit of said wide bandwidth data links is greater than a maximum bandwidth limit of said narrow data links.

24. The method of claim 23 wherein the maximum bandwidth of said narrow bandwidth data links is approximately 1.6 gigabits per second (Gb/s).

25. The method of claim 23 wherein the maximum bandwidth of said wide bandwith data links is approximately 3.2 Gb/s.

26. The method of claim 23 wherein said packets are distributed among said rate matching queues according to packet size, such that large packets greater than a threshold size are placed in large packet queues feeding wide bandwidth data links and such that small packets not greater than said threshold size are placed in small packet queues feeding narrow bandwidth data links.

27. The method of claim 26 wherein said small packet is placed in a particular small packet queue having the greatest unoccupied space.

28. The method of claim 26 wherein said large packet is placed in a particular large packet queue having the greatest unoccupied space.

29. The method of claim 26 wherein said packets are distributed roughly equally among said rate matching queues using a round robin algorithm.

30. The method of claim 26 wherein said threshold size is approximately 200 bytes.

31. The method of claim 26 further comprising inserting a keep-alive packet into any narrow bandwidth data link that is idle for a predetermined period of time.

32. The method of claim 31 wherein said predetermined period of time is programmable.

33. The method of claim 31 wherein said predetermined period of time is on the order of 10 microseconds.

34. The method of claim 16 wherein said packets are received through said input data link at a rate of approximately 10 Gb/s.

35. The method of claim 16 further comprising processing said packets within each of said plurality of substantially parallel data links, such that said processing is limited to a maximum data rate of approximately 2.5 Gb/s.

36. The method of claim 16 wherein said sequence numbering is applied within a header prepended to each of said packets.

37. The method of claim 16 wherein said exception packets are distinguished form said fast path packets by setting a bit within a header prepended to each said packet.

38. A method of control and ordering of information packets in a network router comprising:
 receiving through an input data link said packets;
 sequence numbering said packets;
 distributing said packets among a plurality of rate matching queues, such that each said rate matching queue feeds one of substantially parallel data links having differing information rates;
 flowing said packets through said plurality of substantially parallel data links at differing information rates; and
 reordering said packets after said flowing;
 said packets comprising fast path packets and exception packets different from said fast path packets, wherein said exception packets are processed within a portion of said plurality of substantially parallel data links that is bypassed by said fast path packets, wherein said exception packets are reordered separately and independently from said fast path packets; and
 wherein said separate and independent reordering of exception packets comprises:
 receiving said exception packets from said substantially parallel data links;
 separating said exception packet headers from said exception packet payloads;
 loading said exception packet headers into a plurality of exception reorder queues; and
 removing said exception packet headers from said exception reorder queues in order of said sequence numbering.

39. The method of claim 38 further comprising storing said separated exception packet payloads in a memory device.

40. The method of claim 38 wherein said removing comprises:
 a. if an exception packet header exists in each of said plurality of exception reorder queues, then removing the exception packet header having the lowest sequence number; otherwise
 b. after a time-out mechanism occurs, then removing the exception packet header having the lowest sequence number among all exception packets in any of said exception reorder queues.

41. The method of claim 40 wherein said time-out mechanism is programmable.

42. The method of claim 38 wherein nonordering packets are created within said portion of said plurality of substantially parallel data links wherein said exception packets are processed, said nonordering packets being identified by a bit set within a header of said nonordering packets, such that a said identified nonordering packet is loaded into one of said reorder queues and upon reaching the head of said reorder queue is removed from said reorder queue without regard to any sequence numbering.

* * * * *